United States Patent
Li et al.

(10) Patent No.: US 11,235,496 B2
(45) Date of Patent: Feb. 1, 2022

(54) ONE-STEP SOLUTION CASTING METHOD FOR PREPARING POLYVINYLIDENE FLUORIDE-BASED PYROELECTRIC POLYMER FILM

(71) Applicant: University of Electronic Science and Technology of China, Sichuan (CN)

(72) Inventors: Weizhi Li, Sichuan (CN); Yuming Wu, Sichuan (CN); Xiaosong Du, Sichuan (CN); Jimeng Li, Sichuan (CN); Huiling Tai, Sichuan (CN); Guangzhong Xie, Sichuan (CN)

(73) Assignee: University of Electronic Science and Technology of China, Sichuan (CN)

(*) Notice: Subject to any disclaimer, the term of this patent is extended or adjusted under 35 U.S.C. 154(b) by 299 days.

(21) Appl. No.: 16/188,304

(22) Filed: Nov. 13, 2018

(65) Prior Publication Data
US 2019/0077056 A1  Mar. 14, 2019

(30) Foreign Application Priority Data
Jul. 24, 2018 (CN) .......................... 201810819357.0

(51) Int. Cl.
*B29C 41/00* (2006.01)
*B29C 41/46* (2006.01)
(Continued)

(52) U.S. Cl.
CPC ............ *B29C 41/003* (2013.01); *B29C 41/46* (2013.01); *B29C 41/52* (2013.01); *B29K 2027/16* (2013.01); *B29L 2007/008* (2013.01)

(58) Field of Classification Search
CPC ....... B29C 41/003; B29C 41/46; B29C 41/52; B29K 2027/16; B29L 2007/008
See application file for complete search history.

(56) References Cited

U.S. PATENT DOCUMENTS 4,711,808 A * 12/1987 Marcus ................... B29C 41/12
427/100
10,593,857 B2 * 3/2020 Aliane .................... H01L 41/45
(Continued)

OTHER PUBLICATIONS

Moran-Mirabal, Jose, "Piranha Cleaning—Glass Surfaces", May 2014, McMaster University (Year: 2014).*
(Continued)

*Primary Examiner* — Michael M. Robinson
*Assistant Examiner* — Victoria Bartlett

(57) ABSTRACT

A one-step solution casting method for preparing a PVDF-based pyroelectric polymer film is provided, which belongs to the technical field of functional material preparation. The method comprises steps of: treating a substrate with a hydrophilic reagent to obtain a hydrophilically-modified substrate, and then casting the organic solution of polyvinylidene fluoride (PVDF) or its copolymer on the hydrophilically-modified substrate. After cured, the as-casted PVDF-based film shows pyroelectricity without undergoing any stretching or poling post-treatment, indicates that the dipoles of the one-step prepared film are aligned. The self-polarization of the prepared film is attributed to a hydrogen bond induced layer-by-layer electrostatic self-assembly growth mechanism. The method is simple, low cost, high efficient, high capability to produce thick and large-area film with smooth morphology and ease to be scalized.

8 Claims, 2 Drawing Sheets

(51) Int. Cl.
*B29C 41/52* (2006.01)
*B29L 7/00* (2006.01)
*B29K 27/00* (2006.01)

(56) References Cited

U.S. PATENT DOCUMENTS

2014/0331920 A1* 11/2014 Chang ................ H01L 31/1884
                                              118/108
2018/0309042 A1* 10/2018 Johnson ............... H01L 41/042
2019/0003746 A1*  1/2019 Xie ......................... F25B 21/00
2019/0382544 A1* 12/2019 Yokotani .................. H01G 4/18

OTHER PUBLICATIONS

Kim, Kwang Man, "Effect of Evaporation Temperature on the Crystalline Properties of Solution-Cast Films of Poly(vinylidene fluoride)s", 2003, Korean Journal of Chemical Engineering (Year: 2003).*
"Bain Marie" (Water bath) Wikipedia, Aug. 2016 (Year: 2016).*
Wu, Yumin, et al. Self-Polarization of PVDF Film Triggered by Hydrophilic Treatment for Pyroelectric Sensor with Ultra-Low Piezoelectric Noise, 2019, Nanoscale Research Letters (Year: 2019).*
Gregorio, Rinaldo, Jr, "Effect of crystallization rate on the formation of the polymorphs of solution cast poly(vinylidene fluoride)", Jul. 2008, Polymer, (Year: 2008).*
Ma W Z, Zhang J, Chen S J, et al. Crystalline Phase Formation of Poly(vinylidene fluoride) from Tetrahydrofuran/N,N-dimethylformamide Mixed Solutions[J]. Journal of Macromolecular Science Part B, 2008, 47(3):434-449—Nanjing China.
Salimi A, Yousefi A A. Conformational changes and phase transformation mechanisms in PVDF solution-cast films[J]. Journal of Polymer Science Part B Polymer Physics, 2004, 42(18):3487-3495—Tehran Iran.
Bowen C, Wan C. Multiscale-structuring of polyvinylidene fluoride for energy harvesting: the impact of molecular-, micro- and macro-structure[J]. Journal of Materials Chemistry A, 2017, 5(7)—UK.
Chen S, Li X, Yao K, et al. Seif-polarized ferroelectric PVDF homopolymer ultra-thin films derived from Langmuir-Blodgett deposition[J]. Polymer, 2012, 53(6):1404-1408—Singapore.
Li B, Xu C, Zhang F, et al. Self-polarized piezoelectric thin films: preparation, formation mechanism and appiication[J]. Journal of Materials Chemistry C, 2015, 3(34):8926-8931—Hefei China.
Piert M, Machulla H, Becker G, et al. The piezoresponse force microscopy investigation of seif-polarization alignment in poly(vinylidene fluoride-co-trifluoroethylene) ultrathin films[J]. Soft Matter, 2012, 8(4):1064-1069—Daejeon Korea.
Soin N, Boyer D, Prashanthi K, et al. exclusive self-aligned β-phase PVDF films with abnormal piezoelectric coefficient prepared via phase inversion[J]. Chemical Communications, 2015, 51(39):8257—Bolton UK.
Si S K, Karan S K, Paria S, et al. A strategy to develop an efficient piezoelectric nanogenerator through ZTO assisted γ-phase nucleation of PVDF in ZTO/PVDF nanocomposite for harvesting biomechanical energy and energy storage application[J]. Materials Chemistry & Physics, 2018—Kharagpur India.
Karan S K, Mandal D, Khatua B B. Self-powered flexible Fe-doped RGO/PVDF nanocomposite: an excellent material for a piezoelectric energy harvester[J]. Nanoscale, 2015, 7(24):10655-10666—Kharagpur India.

Lee M, Chen C Y, Wang S, et al. A hybrid piezoelectric structure for wearable nanogenerators[J]. Advanced Materials, 2012, 24(13):1759-1764—Atlanta USA.
Karan S K, Bera R, Paria S, et al. An Approach to Design Highly Durable Piezoelectric Nanogenerator Based on Self-Poled PVDF/AIO-rGO Flexible Nanocomposite with High Power Density and Energy Conversion Efficiency[J]. Advanced Energy Materials, 2016, 6(20):1601016—Kharagpur India.
Tamang A , Ghosh SK, Garain S, et al. DNA-Assisted β-phase Nucleation and Alignment of Molecular Dipoles in PVDF Film: A Realization of Self-Poled Bioinspired Flexible Polymer Nanogenerator for Portable Electronic Devices[J]. ACS Applied Materials & Interfaces, 2015, 7(30):16143-16147—Kolkata India.
Ghosh S K, Biswas A, Sen S, et al. Yb3+ Assisted Self-Polarized PVDF Based Ferroelectretic Nanogenerator: A Facile Strategy of Highly Efficient Mechanical Energy Harvester Fabrication[J]. Nano Energy, 2016, 30:621-629—Kolkata India.
Samiran G, Tridib Kumar S, Prakriti A, et al. Self-poled transparent and flexible UV light-emitting cerium complex—PVDF composite: a high-performance nanogenerator[J]. ACS Applied Materials & Interfaces, 2015, 7(2):1298-1307—Kolkata India.
Ghosh S K, Xie M, Bowen C R, et al. A hybrid strain and thermal energy harvester based an an infra-red sensitive Er3 + modified poly(vinylidene fluoride) ferroelectret structure[J]. Scientific Reports, 2017, 7(1):16703—Kolkata India.
Adhikary P, Garain S, Ram S, et al. Flexible hybrid eu3+ doped P(VDF-HFP) nanocomposite film possess hypersensitive electronic transitions and piezoelectric throughput[J]. Journal of Polymer Science Part B Polymer Physics, 2016, 54(22):2335-2345—Kharagpur India.
Sinha T K, Ghosh S K, Maiti R, et al. Graphene-Silver-Induced self-Polarized PVDF-Based Flexible Plasmonic Nanogenerator Toward the Realization for New Class of Self Powered Optical Sensor[J]. ACS Appl Mater Interfaces, 2016, 8(24):14986-14993—Kharagpur India.
Ghosh S K, Sinha T K, Mahanty B, et al. Porous polymer composite membrane based nanogenerator: A realization of self-powered wireless green energy source for smart electronics applications[J]. Journal of Applied Physics, 2016, 120(17):242—Kolkata India.
Jana S, Garain S, Ghosh S K, et al. The preparation of γ-orystalline non-electrically poled photoluminescant ZnO-PVDF nanocomposite film for wearable nanogenerators[J]. Nanotechnology, 2016, 27(44):445403—Kolkata India.
Mahanty B, Ghosh S K, Garain S, et al. An effective flexible wireless energy harvester/sensor based on porous electret piezoelectric polymer[J]. Materials Chemistry & Physics, 2017, 186:327-332—Kolkata India.
Thakur P, Kool A, Hoque N A, et al. Superior performances of in situ, synthesized ZnO/PVDF thin film based self-poled piezoelectric nanogenerator and self-charged photo-power bank with high durability[J]. Nano Energy, 2018, 44:456-467—Kolkata India.
Ghosh S K, Sinha T K, Mahanty B, et al. Self-poled Efficient Flexible "Ferroelectretic" Nanogenerator: A New Class of Piezoelectric Energy Harvester[J]. Energy Technology, 2016, 3(12):1190-1197—Kolkata India.
Yuan D, Li Z, Thitsartarn W, et al. β phase PVDF-HCP induced by mesoporous SiO2 nanorods: Synthesis and formation mechanism[J]. Journal of Materials Chemistry C, 2015, 3(15):3708-3713—Singapore.

* cited by examiner

ONE-STEP SOLUTION CASTING METHOD FOR PREPARING POLYVINYLIDENE FLUORIDE-BASED PYROELECTRIC POLYMER FILM

CROSS REFERENCE OF RELATED APPLICATION

The present application claims priority under 35 U.S.C. 119(a-d) to CN 201810819357.0, filed Jul. 24, 2018.

BACKGROUND OF THE PRESENT INVENTION

Field of Invention

The present invention relates to the field of a functional material preparation technology, and more particularly to a one-step solution casting method for preparing a PVDF-based pyroelectric polymer film.

Description of Related Arts

Polyvinylidene fluoride (PVDF) and its copolymers are a class of functional materials with piezoelectric effect, pyroelectric effect and ferroelectric effect. Since PVDF has excellent flexibility and is easy to be produced into large-area films, PVDF has become key material in the research hotspots of wearable electronics and nano-generator nowadays. In order to possess piezoelectricity, pyroelectricity or ferroelectricity, the polymer film is required to have a higher content of polar phase of β phase or γ phase (especially β phase), and the dipoles in the polar phases must have a certain degree of preferred orientation rather than distributed in a chaotic manner. The conventional preparation route for PVDF piezoelectric/pyroelectric/ferroelectric films must undergo three successive steps of film formation, stretching and poling, where the conventional film forming process mainly employs a solution casting method and a melt cooling method. The films obtained by cooled from a melt of PVDF predominately crystalized into α phase, while the films prepared by the conventional solution casting method usually crystalized into mixed phases. One can increase the content of the polar phase in the solution casting film by adjusting the solvent, evaporation rate, temperature, humidity and other processing parameters. Please refer to a paper with a title of "Crystalline phase formation of poly(vinylidenefluoride) from tetrahydrofuran/N,N-dimethylformamide mixed solutions" published in *Journal of Macromolecular Science in* 2008; and a paper with a title of "Conformational changes and phase transformation mechanisms in PVDF solution-cast films" published in *Journal of Polymer Science* in 2004. However, the dipoles of the polar phase in the obtained casted film are all disorderly arranged, and the film does not have piezoelectric, pyroelectric, and ferroelectric properties. Therefore, the stretching process after film formation is necessary because it increases the polar phase content via the transition of α phase to β phase. Especially it is an essential step for the as-stretched film having exclusively α phase, and is also advantageous for the film which already has β phase to increase the content of β phase. After the film is stretched, although the dipoles distribute within a plane perpendicular to the stretching direction, the net dipole moment is still zero, so a poling process (either high-voltage thermal poling or corona-poling) must be applied to align the dipoles along the direction of the electric field. In summary, stretching and poling are indispensable steps in the conventional PVDF ferroelectric film preparation process. The role of the stretching step is to increase the content of β phase in the polymer film but the dipoles are not oriented. Thus the role of the subsequent poling step is to achieve a dipolar orientation of the polymer film by the electric field, thereby increasing the residual polarization of the prepared film, and improving the piezoelectric, pyroelectric and ferroelectric properties of the material.

In recent years, pluralities of new methods for preparing polyvinylidene fluoride and its copolymer films having a piezoelectric, pyroelectric or ferroelectric property have been emerging by only one-step process. The one-step process belongs to the film formation step, it does not need any stretching or poling steps, whereas the as-prepared film does have piezoelectricity/pyroelectricity/ferroelectricity. Therefore the one-step method greatly simplifies the preparation process, reduces equipment investment, reduces costs, improves production efficiency, and is beneficial to industrial promotion. In particular, the omitting of poling process avoids the risk of film breakdown during poling.

Among the one-step processes that have been reported, electrospinning is the most widely utilized method. At least several tens of papers have been published in this aspect. Herein, a review paper of *Journal of Materials Chemistry* in 2017, Multiscale-structuring of polyvinylidene fluoride for energy harvesting: the impact of molecular-, micro- and Macro-structure is taken as a representative. In Section 2.2.8 of this paper, the PVDF-based polymer films prepared by one-step electrospinning method for energy harvesting application are summarized. Generally speaking, a strong polar solvent is required during the process of electrospinning to facilitate the formation of β phase or γ phase in the film. The solution jet is stretched under the action of a strong electric field, induces an in-situ stretching and poling effect, which makes the as-electrospun nanowire film have piezoelectricity. It is believed that electrospinning can not only facilitate more ferroelectric phase formation, but also induce dipole orientation in the polymer fibers. However, the effects of the electrospinning process on the dipolar orientation of the polymer fibers are still not fully understood and conflicting results have been reported.

The LB technique is another example of one-step method, please refer to *Polymer* in 2012, "Self-polarized ferroelectric PVDF homopolymer ultra-thin films derived from Langmuir-Blodgett deposition". Characterized by piezoresponse force microscopy (PFM), the dipoles of the as-prepared PVDF or poly(vinylidene fluoride-trifluoroethylene) [P(VDF-TrFE)] copolymer LB multilayer film are already aligned without undergoing any poling treatment. However, the LB film technique is only suitable for the preparation of ultra-thin films. In this paper, the deposition of the film is repeated 20 times in a vertical transfer manner to reach a thickness of about 29 nm. Therefore, the application of the LB technique in the preparation of a slightly thicker film is extremely labor-intensive and time-consuming, the cost is high and it is difficult to achieve large-scale industrial manufacture.

A paper of "Self-polarized piezoelectric thin films: reparation, formation mechanism and application" published on *Journal of Materials Chemistry C* in 2015 discloses a method in which a PVDF organic solution droplet is dropped on a surface of a NaCl aqueous solution to form a film. The prepared film is self-polarized, since the dipoles are preferentially oriented characterized by PFM and piezoelectric responses are demonstrated both by the film and by a device made by the film. However, the film prepared by this method is very porous, which brings difficulties for the preparation of the subsequent upper and lower electrode films.

Spin coating, which is the most common preparation method for polymer films, can be also utilized as a one-step method to prepare PVDF copolymer film in some special cases. "The piezoresponse force microscopy investigation of self-polarization alignment in poly(vinylidene fluoride-co-trifluoroethylene) ultrathin films" published on *Soft Matter* in 2012 discloses that when PEDOT:PSS or ITO is served as the bottom electrode, the P(VDF-TrFE) ultra-thin film spin-coated on the bottom electrode is self-polarized without external poling investigated by PFM. The authors of the paper believe that the self-polarization arises from the n-type semiconductor characteristic of P(VDF-TrFE) ultrathin film, which forms a Schottky barrier between the copolymer and the bottom electrode, induces a built-in-field at the interface and the internal bias makes the electronic dipoles aligned. According to the above theoretical interpretation, the built-in-field formed can only exist at the contact interface of the film and the bottom electrode, it cannot reach a thicker film to make it effectively polarized.

A paper "Exclusive self-aligned beta-phase PVDF films with abnormal piezoelectric coefficient prepared via phase inversion" published on *Chemical Communications* in 2015 discloses a method of immediately quenching spin-coated PVDF film in water. PFM observation shows that the piezoelectric phase has an orientation, but the film prepared by the method has poor surface topography and thickness uniformity.

The solution casting method is also widely applied to prepared polymer films, especially thick films. It is reported by many researchers that when some additives are added to PVDF or its copolymer solutions, the casted composite films are self-polarized. Please refer to *Materials Chemistry and Physics* in 2018, "A strategy to develop an efficient piezoelectric nano-generator through ZTO assisted γ-phase nucleation of PVDF in ZTO/PVDF nanocomposite for harvesting bio-mechanical energy and energy storage application" and the references in Table 1 of this paper. The effective additive includes ferroelectric nanoparticles such as zinc titanate, carbon-based materials such as graphene oxide (GO), binary additives such as iron and reduced graphene oxide (rGO), aluminum and rGO, even biological materials such as DNA. Although the solution casting method is simple in terms of equipment investment and operation steps, the key to this methodology is not the casting process itself but the kind of material that should be added to PVDF or its copolymers to obtain piezoelectric/pyroelectric/ferroelectric performances without poling. Up to now, there is still no well-established theory in this aspect. The choice of additives is still basically experimentally, the efficiency is relatively low. Besides, how to make the inorganic additive dispersed uniformly in the polymer matrix without agglomeration also becomes a difficulty in preparing the composite material by this method.

Based on the above, we can see that in the one-step process for preparing the self-polarized polyvinylidene fluoride and its composite films, the electrospinning method has the problem that the mechanism is unclarified and the equipment is expensive. The LB method also needs expensive equipments and the film deposition is very slow, thus is limited to ultra-thin film applications. The film formed by dropping droplet on water surface suffers from porous structure and difficult to prepare large-area film. The solution casting method for preparing PVDF-based composite films needs to add suitable inorganic fillers to the polymer solutions, otherwise the pure PVDF cannot achieve piezo-electricity/pyroelectricity/ferroelectricity without poling.

SUMMARY OF THE PRESENT INVENTION

In view of the problems existed in the one-step processes for depositing the PVDF-based polymer and composite films in the conventional art, the present invention provides a simple and effective one-step solution casting method for preparing a PVDF-based polymeric film, which does not require stretching and poling processes. Pure PVDF and its copolymer films with pyroelectric response can be obtained by this one-step casting process, which simplifies the fabrication process, reduces equipment investment, reduces cost and improves production efficiency, and thus is conducive to industrial promotion.

In order to achieve the objects mentioned above, the present invention provides technical solutions as follows.

A one-step solution casting method for preparing a polyvinylidene fluoride (PVDF)-based pyroelectric polymer film, comprises steps of:

treating a substrate with a hydrophilic reagent, introducing a hydrophilic group on a surface of the substrate to obtain a hydrophilically-modified substrate;

casting a PVDF-based polymer solution onto the hydrophilically-modified substrate to form a liquid film, curing the liquid film by controlling a casting temperature and casting time to volatilize solvent in the liquid film, in such a manner that a PVDF-based polymer film with orderly arranged dipoles is obtained.

Preferably, the hydrophilic group modified on the substrate surface comprises: a hydroxyl group (—OH), an amino group (—NH$_2$) or a carboxyl group (—COOH).

Preferably, the hydrophilic reagent used to treat the substrate comprises a mixed solution of concentrated sulfuric acid and hydrogen peroxide (Piranha solution) or a mixed solution of aqueous ammonia, hydrogen peroxide and deionized water.

Preferably, the substrate comprises a glass substrate or a silicon wafer.

Preferably, the PVDF-based polymer comprises a homopolymer of polyvinylidene fluoride (PVDF), copolymers of poly(vinylidene fluoride-trifluoroethylene) [P(VDF-TrFE)] or poly(vinylidene fluoride-hexafluoropropylene) [P(VDF-HFP)].

Preferably, a concentration of the PVDF-based polymer solution is at a range of 3 wt %-40 wt %.

Preferably, the casting temperature is at a range of 40° C.-60° C., the casting time is at a range of 2-4 hours.

The principle of the present invention is described in details as follows. When the substrate is treated with a hydrophilic reagent, hydrophilic groups such as hydroxyl group (—OH), amino group (—NH$_2$), carboxyl group (—COOH) or the like are modified on the surface of the substrate, and then the PVDF-based polymer solution is casted on the hydrophilically-modified substrate. Since the fluorine (F) atom is extremely electronegative, hydrogen bonds are formed between the F atoms in the PVDF-based polymer and the hydrophilic groups modified on the surface of the substrate. The hydrogen bond is essentially an electrostatic attraction force. This force attracts the mobile F atoms in the PVDF-based polymer to move closed to the hydroxyl groups, amino groups, carboxyl groups or the like modified on the substrate surface, which drives the carbon chains in the polymer to move and to rotate as well. On the one hand, the rotation of the carbon chains can promote the transformation of the molecular conformation from the non-polar phase to the polar phase. On the other hand, the hydrogen bonds formed on the surface of the substrate makes the F atoms in the first molecular layer of the polymer closest to the substrate are arranged at the substrate side whilst the corresponding hydrogen (H) atoms are arranged at the film side. As a result, the dipoles in the first polymer layer formed on the surface of the substrate are orderly aligned since the dipole is composed of a negatively charged $CF_2$ group and a positively charged $CH_2$ group. That is to say, when the first layer of polymeric molecules is immobilized on the substrate by hydrogen bonding, the new grown solid surface is terminated with the positively charged $CH_2$ dipoles. They attract $CF_2$ dipoles in the polymer solution via a dipole-dipole interaction, inducing the PVDF-based polymer film to grow in a layer-by-layer manner according to an electrostatic self-assembly mechanism, thereby realizing self-polarization during the film formation process of the PVDF-based polymer film.

Compared with the conventional art, the beneficial effects of the present invention are as follows.

The invention utilizes the hydrogen bonding mechanism to realize the dipolar orientation alignment of the first molecular layer of the PVDF-based polymer, thus induces the subsequent molecular layers to be aligned in a layer-by-layer manner at the effect of the electrostatic self-assembly mechanism. Based on this film growth mode, the transformation from non-polar phase to polar phase can be promoted to increase the content of the polar phase in the film, and the dipoles in the PVDF-based polymer can be orderly aligned, so that the film can be prepared in only one step of solution casting to achieve pyroelectricity. The present invention does not require a conventional three-step process of film formation, stretching and poling, avoids the risk of film breakdown during poling thus simplifies the fabrication process. Even compared with other one-step methods emerged in recently years, the equipment investment required by the present invention is much lower, and it has a higher ability of producing thick and large-area film with smooth morphology. Thereby the method of the present invention is favorable for promoting the industrial manufacture of piezoelectric, pyroelectric and ferroelectric polymer films.

These and other objectives, features, and advantages of the present invention will become apparent from the following detailed description, the accompanying drawings, and the appended claims.

References in the Figs: 1—fluorine atom in PVDF; 2—carbon atom in PVDF; 3—hydrogen atom in PVDF; 4—substrate; 5—hydroxyl group on the substrate; 6—hydrogen bond.

DETAILED DESCRIPTION OF THE PREFERRED EMBODIMENT

The technical solutions of the present invention will be clearly and completely described in the following with reference to the accompanying drawings and preferred embodiments, in such a manner that those skilled in the art are capable of understanding the principles and characteristics of the present invention.

A one-step solution casting method for preparing a PVDF-based pyroelectric polymer film is characterized in comprising following steps of:

step (1): preparing PVDF-based pyroelectric polymer solution, comprising:

according to application demands, selecting a suitable pyroelectric polymer material, wherein in the present invention, PVDF and its copolymers thereof are mainly selected; dissolving the pyroelectric polymer powder or particles into a suitable solvent; and stirring evenly under heating to obtain a pyroelectric polymer solution;

step (2): treating the substrate with a hydrophilic reagent; comprising:

putting a clean substrate into a beaker containing a hydrophilic reagent; then placing the beaker into a water bath with a constant temperature for a fixed period of time; taking the substrate out, and then washing and drying with deionized water;

step (3): preparing the PVDF-based pyroelectric polymer film; comprising:

casting the pyroelectric polymer solution on the substrate which is treated by the hydrophilic reagent to form a liquid film, and curing the liquid film by controlling a casting temperature and casting time, in such a manner that the solvent in the liquid film is volatilized, thereby curing to obtain a PVDF-based pyroelectric polymer film having orderly aligned dipoles.

Figure 1:
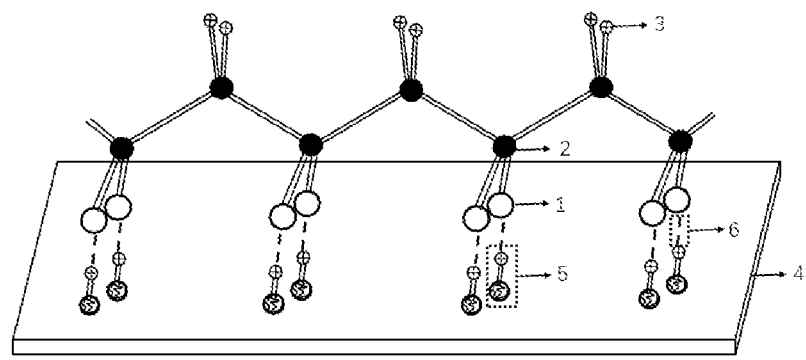
FIG. 1 is a schematic view showing an arrangement of a first layer of polyvinylidene fluoride (PVDF) molecules on a substrate which is modified with hydroxyl groups.

When the substrate 4 is treated with a hydrophilic reagent, a hydrophilic group such as hydroxyl group (—OH) 5 is modified on the substrate surface. Due to the great difference in electronegativity between an oxygen atom and a hydrogen atom, the hydrogen atom of a hydroxyl group 5 on the surface of the substrate 4 is an electron-deficient site and positively charged. On the contrary, the fluorine atom 1 of the PVDF-based polymer in the liquid film has strongest electronegativity and is negatively charged. That is to say, the $CF_2$ group of the polymer which is half of a dipole, is negatively charged; while its counterpart, the $CH_2$ group is positively charged. Therefore, when a PVDF-based polymer is casted on a hydroxyl group 5 modified substrate 4, the fluorine atom 1 in the polymer as well as the $CF_2$ group is attracted by the hydroxyl group 5 on the substrate 4, moves closing to it and forms a hydrogen bond 6 with it; while the $CH_2$ group is repelled by the hydroxyl group 5 and moves in the direction away from the substrate surface. The opposite moving directions of the $CF_2$ and $CH_2$ groups drive the carbon chain in the PVDF-based polymer to rotate, facilitates the formation of a TTT conformation, namely, the β phase. When the hydrogen bonds 6 are eventually formed, the first layer of the polymer molecules is immobilized on the substrate surface. In such a way the fluorine atoms 1 together with the $CF_2$ groups are orderly arranged at the substrate 4 side, whilst the hydrogen atoms 3 together with the $CH_2$ groups are orderly arranged at the film side, as illustrated in FIG. 1. This means that the dipoles of the first molecular layer of the PVDF-based polymer deposited on the substrate 4 are aligned. Thus, the new grown solid surface is also positively charged, although not by hydroxyl groups but by $CH_2$ dipoles. It attracts the $CF_2$ dipoles of the polymer in the solution via a dipole-dipole interaction, induces the film further grows in a layer-by-layer mode at the effect of an electrostatic self-assembly mechanism. The layer-by-layer growth process is finished at the liquid film stage, then the film is fully cured, the PVDF-based polymer with aligned dipoles is realized.

Figure 2:
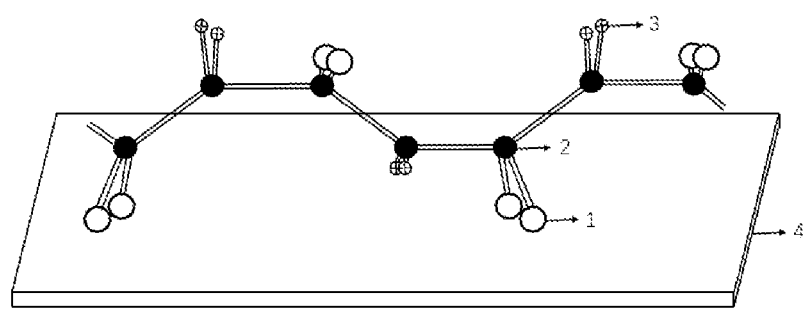
FIG. 2 is a schematic view showing the arrangement of the first layer of PVDF molecules on the substrate which is not treated with hydrophilic reagent.

If the substrate is not treated with a hydrophilic reagent, the arrangement of the first molecular layer of polyvinylidene fluoride on the substrate is schematically shown in FIG. 2. It can be seen that the dipoles in the first polymer layer on the substrate 4 are disorderly arranged, which causes the arrangement of the dipoles in the subsequent polymer layers to be disordered as well.

Embodiment 1

Dissolving polyvinylidene fluoride (PVDF) powder in a solvent of N,N-dimethylformamide (DMF) to prepare a solution having a PVDF mass percentage of 15%, magnetically stirring for 2 hours under heating at 60° C. in a water bath until the PVDF solute is completely dissolved;

preparing a Piranha solution as a hydrophilic reagent by mixing 98% concentrated sulfuric acid and 30% hydrogen peroxide with a volume ratio of 7:3 in a breaker; immersing a clean glass substrate in the Piranha solution; then sending the breaker into a water bath and keeping a constant temperature of 50° C. for 1 hour, then taking out the glass substrate and washing with deionized water and drying to obtain a glass substrate modified with hydroxyl groups;

casting the PVDF solution prepared above on the glass substrate modified with hydroxyl groups to form a liquid film; adjusting a temperature of a controllable heating plate to 40° C. to evaporate the DMF solvent in the liquid film, solidifying for 4 hours to obtain a PVDF film with a size of 20×20 cm² and a thickness of 52 μm.

In the Embodiment 1, in order to test a pyroelectric response of the as-casted PVDF film, each side of the PVDF film is deposited on an aluminum electrode with a size of 15×15 mm² by vacuum evaporation, and then the two aluminum electrodes are connected to a signal amplifier through conductive leads, and the signal amplifier is connected to an oscilloscope by a coaxial cable. A specific process of the test is as follows.

Figure 3:
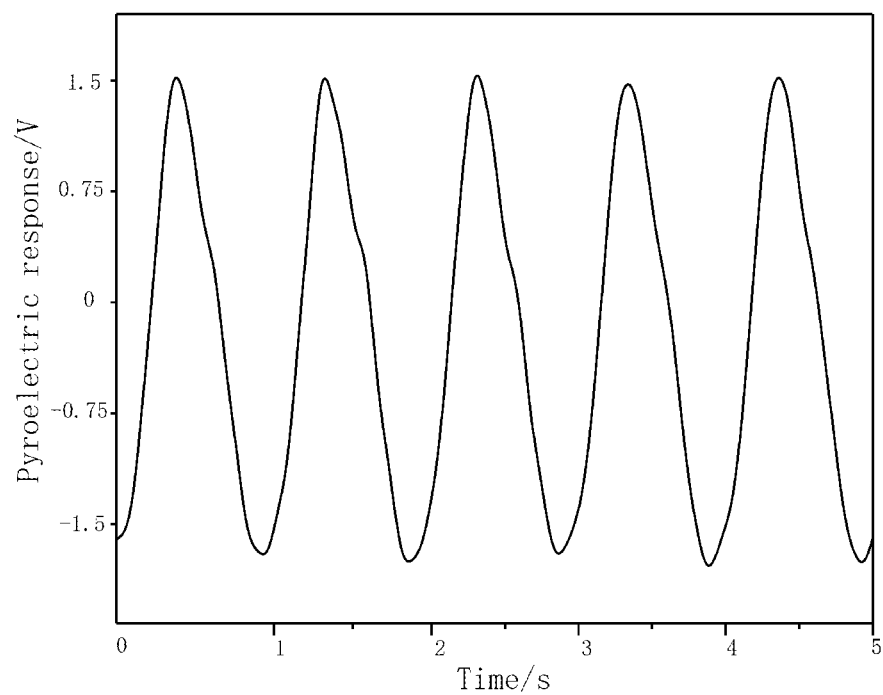
FIG. 3 is a diagram showing pyroelectric response signal of a PVDF film provided in Embodiment 1 of the present invention.

The present invention utilizes an infrared laser emitter to emit an infrared laser with a spot diameter of φ3 mm, and an output power and an output frequency of the infrared laser are modulated by a signal generator to 80 mW and 1 Hz respectively. The infrared laser is vertically irradiated on an upper electrode of the PVDF film prepared in the Embodiment 1 and the corresponding signals collected by the oscilloscope is shown in FIG. 3. It can be seen that the frequency of the recorded signal is also 1 Hz, indicating that the signal is a pyroelectric response to the pulsed laser irradiation loaded on the PVDF film. It demonstrates that the PVDF film not only has high content of polar phase but also the polar phase is dipolar oriented, otherwise it can't show pyroelectricity. It should be note that the PVDF film prepared in Embodiment 1 does not undergo any electric poling process, implies that the as-casted film is self-polarized. In Embodiment 1, the pyroelectric response is 3.1 V.

Contrast Embodiment

For comparison, a clean glass substrate which is not treated with a hydrophilic reagent is employed as a substrate. A DMF solution with a mass percentage of PVDF of 15% is casted on the surface of the glass substrate using identical casting parameters as in Embodiment 1 to prepare a PVDF film as a contrast embodiment. And then the contrast film is tested by the identical laser irradiation method to measure an open circuit voltage between the two electrodes with each on one side of the film. However, the oscilloscope does not record any signal, which indicates that the dipoles in the film on an unmodified substrate are disorderly arranged, so that pyroelectric signals are not capable of being generated.

Embodiment 2

Dissolving a copolymer of poly(vinylidene fluoride-trifluoroethylene) [P(VDF-TrFE)] powder with VDF to TrFE mole ratio of 80:20 in a solvent of N,N-dimethy lacetamide (DMAc) to prepare a solution having a P(VDF-TrFE) mass percentage of 15%, magnetically stirring for 2 hours under heating at 60° C. in a water bath until the P(VDF-TrFE) solute is completely dissolved;

putting a clean glass substrate into a beaker containing a Piranha solution (mixture of 98% concentrated sulfuric acid and 30% hydrogen peroxide with a volume ratio of 3:1); then sending the breaker into a water bath and keeping a constant temperature of 50° C. for 3 hours, then taking out the glass substrate and washing with deionized water and drying to obtain a glass substrate modified with hydroxyl groups;

casting the P(VDF-TrFE) solution prepared above on the glass substrate modified with the hydroxyl groups to form a liquid film; adjusting a temperature of a controllable heating plate to 50° C. to evaporate the DMAc solvent in the liquid film, solidifying for 4 hours to obtain a P(VDF-TrFE) film with a size of 20×20 cm² and a thickness of 56 μm.

Adopting the identical test method as in Embodiment 1, infrared laser is irradiated onto the P(VDF-TrFE) film prepared in Embodiment 2. The oscilloscope records a pulsed pyroelectric response signal of 1 Hz with an amplitude of 3.3V.

Embodiment 3

Dissolving polyvinylidene fluoride (PVDF) powder in a solvent of N,N-dimethylformamide (DMF) to prepare a solution having a PVDF mass percentage of 10%, magnetically stirring for 2 hours under heating at 60° C. in a water bath until the PVDF solute is completely dissolved;

putting a clean (100) monocrystalline silicon wafer into a beaker containing a mixed solution of 25% aqueous ammonia, 30% hydrogen peroxide solution and deionized water with a volume ratio of 1:2:7; then sending the breaker into a water bath and keeping a constant temperature of 90° C. for 1 hour, then taking out the silicon wafer and washing with deionized water and drying to obtain a monocrystalline silicon wafer which is modified with hydroxyl groups;

casting the PVDF solution prepared above on the monocrystalline silicon wafer which is modified with the hydroxyl groups to form a liquid film; adjusting a temperature of a controllable heating plate to 40° C. to evaporate the DMF solvent in the liquid film, solidifying for 4 hours to obtain a PVDF film with a diameter of 8 inches and a thickness of 38 μm. Adopting the identical test method as in Embodiment 1, infrared laser is irradiated onto the PVDF film prepared in Embodiment 3. The oscilloscope records a pulsed pyroelectric response signal of 1 Hz with an amplitude of 1.7 V.

Embodiment 4

Dissolving a copolymer of Poly(vinylidene fluoride-hexafluoropropylene) [P(VDF-HFP)] powder with VDF to HFP mole ratio of 90:10 in a solvent of N,N-dimethy lacetamide (DMAc) to prepare a solution having a P(VDF-HFP) mass percentage of 15%, magnetically stirring for 2 hours under heating at 60° C. in a water bath until the P(VDF-HFP) solute is completely dissolved;

putting a clean (100) monocrystalline silicon wafer into a beaker containing a mixed solution of 25% aqueous ammonia, 30% hydrogen peroxide solution and deionized water with a volume ratio of 1:2:7; then sending the breaker into a water bath and keeping a constant temperature of 90° C. for 1 hour, then taking out the silicon wafer and washing with deionized water and drying to obtain a monocrystalline silicon wafer which is modified with hydroxyl groups;

casting the P(VDF-HFP) solution prepared above on the monocrystalline silicon wafer which is modified with hydroxyl groups to form a liquid film; adjusting a temperature of a controllable heating plate to 40° C. to evaporate the DMAc solvent in the liquid film, solidifying for 4 hours to obtain a P(VDF-HFP) film with a diameter of 8 inches and a thickness of 55 μm.

Adopting the identical test method as in Embodiment 1, infrared laser is irradiated onto the P(VDF-HFP) film prepared in Embodiment 4. The oscilloscope records a pulsed pyroelectric response signal of 1 Hz with an amplitude of 2.7 V.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparing a polyvinylidene fluoride (PVDF)-based pyroelectric polymer film, comprising steps of:

treating a substrate with a hydrophilic reagent, introducing a hydrophilic group on a surface of the substrate to obtain a hydrophilically-modified substrate;

casting a PVDF-based polymer solution onto the hydrophilically-modified substrate to form a liquid film, wherein dipoles in a first polymer layer closest to the substrate are orderly aligned through hydrogen bonds formed between the F atoms in the PVDF-based polymer and the hydrophilic group modified on the substrate, thus induces subsequent polymer layers to be aligned in a layer-by-layer manner by dipole-dipole interactions, in such a manner that a PVDF-based polymer film with orderly arranged dipoles is obtained by curing the liquid film via controlling a casting temperature and casting time to volatilize solvent in the liquid film.

2. The method for preparing a PVDF-based pyroelectric polymer film, as recited in claim 1, wherein the hydrophilic group modified on the substrate surface comprises: a hydroxyl group (—OH), an amino group (—$NH_2$) or a carboxyl group (—COOH).

3. The method for preparing a PVDF-based pyroelectric polymer film, as recited in claim 1, wherein the hydrophilic reagent used to treat the substrate comprises a mixed solution of concentrated sulfuric acid and hydrogen peroxide or a mixed solution of aqueous ammonia, hydrogen peroxide and water.

4. The method for preparing a PVDF-based pyroelectric polymer film, as recited in claim 1, wherein the substrate comprises a glass substrate or a silicon wafer.

5. The method for preparing a PVDF-based pyroelectric polymer film, as recited in claim 1, wherein the PVDF-based polymer comprises polyvinylidene fluoride (PVDF), a copolymer of poly(vinylidene fluoride-trifluoroethylene) [P(VDF-TrFE)] and a copolymer of poly(vinylidene fluoride-hexafluoropropylene) [P(VDF-HFP)].

6. The method for preparing a PVDF-based pyroelectric polymer film, as recited in claim 1, wherein a concentration of the PVDF-based polymer solution is at a range of 3 wt %-40 wt %.

7. The method for preparing a PVDF-based pyroelectric polymer film, as recited in claim 1, wherein a casting temperature is at a range of 40° C.-60° C., and casting time is at a range of 2-4 hours.

8. A method for preparing a PVDF-based pyroelectric polymer film, comprising steps of: step (1): preparing PVDF-based pyroelectric polymer solution, comprising: according to application demands, selecting a suitable pyroelectric polymer material comprising PVDF and its copolymers: dissolving pyroelectric polymer powder or particles into a suitable solvent; and stirring evenly under heating to obtain a pyroelectric polymer solution; step (2): treating a substrate with a hydrophilic reagent; comprising: putting the substrate into a beaker containing the hydrophilic reagent; then placing the beaker into a water bath with a constant temperature for a fixed period of time; taking the substrate out, and then washing and drying with deionized water; step (3): preparing the PVDF-based pyroelectric polymer film; comprising: casting the pyroelectric polymer solution on the substrate which is treated by the hydrophilic reagent to form a liquid film, and curing the liquid film by controlling a casting temperature and casting time, in such a manner that the solvent in the liquid film is volatilized, thereby curing to obtain a PVDF-based pyroelectric polymer film having orderly aligned dipoles; wherein when the substrate (4) is treated with the hydrophilic reagent, a hydrophilic group is modified on the substrate surface; due to great difference in electronegativity between an oxygen atom and a hydrogen atom, the hydrogen atom of a hydroxyl group (5) on the surface of the substrate (4) is an electron-deficient site and positively charged; wherein the fluorine atom (1) of the PVDF-based pyroelectric polymer film is most electronegative and is negatively charged; the $CF_2$ group of the polymer which is half of a dipole, is negatively charged; while its counterpart, the $CH_2$ group is positively charged.

* * * * *